United States Patent [19]

Waltz

[11] Patent Number: 5,091,844

[45] Date of Patent: Feb. 25, 1992

[54] PREEMPTIVE CONSTRAINT CONTROL

[76] Inventor: Albert J. Waltz, 2008 N. Memorial Ct., Pasadena, Tex. 77502

[21] Appl. No.: 431,835

[22] Filed: Nov. 6, 1989

[51] Int. Cl.$^5$ ............................................. G06F 15/46
[52] U.S. Cl. .................................. 364/153; 364/137; 364/494; 364/162
[58] Field of Search ................ 364/162, 494, 153, 137

[56] References Cited

U.S. PATENT DOCUMENTS

| | | | |
|---|---|---|---|
| 3,781,533 | 12/1973 | Barnstone et al. | 364/153 |
| 3,838,256 | 9/1974 | Mosler | 364/153 |
| 4,258,424 | 3/1981 | Giras et al. | 364/494 |
| 4,349,869 | 9/1982 | Prett et al. | 364/149 X |
| 4,371,944 | 2/1983 | Stewart et al. | 364/502 |
| 4,602,326 | 7/1986 | Kraus | 364/159 X |
| 4,616,308 | 10/1986 | Morshedi et al. | 364/159 |
| 4,807,150 | 2/1989 | Hobbs | 417/4 X |

Primary Examiner—Jerry Smith
Assistant Examiner—Allen M. Lo
Attorney, Agent, or Firm—Pravel, Gambrell, Hewitt, Kimball & Krieger

[57] ABSTRACT

A means of controlling a process with a multiplicity of measurements dependent on one process parameter, so that only the most constraining of the measurements manipulates the process in such a way that the performance of each individual controller selected is equivalent to the performance if there were a single controller controlling only one measurement, the most constraining variable. The means of controlling also manipulates the process to prevent a measurement, that is within a process constraint limit, from excessively exceeding that process constraint limit when it is projected that it would do so without the corrective manipulation.

36 Claims, 2 Drawing Sheets

PREEMPTIVE CONSTRAINT CONTROL

FIELD OF THE INVENTION

This invention is directed to a method for controlling a process having a plurality of measured variables each affected by and dependent upon a single process parameter with each measurement being controlled through adjustment of the process parameter. The method utilizes a preemptive constraint control system which automatically optimizes performance of a process unit by continuously monitoring selected operating variables associated with the operation of the unit.

BACKGROUND OF THE INVENTION

The success of many process operations depends on the ability to monitor, to regulate and to control process conditions such as pressure, temperature, velocity, density, flow, weight, inventory among other measured or calculated conditions. These conditions are controlled through feedback of a signal, representing the measured or calculated condition, to a controller that manipulates the process based upon the difference between the signal and a desired value or control setpoint. A typical controller uses proportional integral and derivative (PID) control algorithms. The process is adjusted by manipulating process equipment to effect the flow of energy or material, such as, for example, by adjustment of a valve that impedes or otherwise restricts fluid flow.

Control of process conditions is important because process conditions affect product quality and production rate, both of which have a major effect on process plant operating profit. Controlling plant conditions at optimal values helps to maximize profit while deviation of conditions from optimal values reduces profit. Thus, it is economically important to reduce deviation.

Optimum conditions are frequently determined by processing and equipment limitations. In a distillation separation process, for example, quality specifications will limit the product impurity content. However, if the impurity is of little value, it is, nevertheless, profitable to sell as much impurity with the product as the quality specification permits. Thus, controlling the product composition as close to specification as possible without violating the specification limit, for example, without introducing too much impurity, is economically advantageous.

The amount of energy flowing through a distillation column determines the extent of separation, thus, the amount of product recovery. The amount of energy flowing through the column can be limited by reboiler or condenser heat transfer or by column flooding. Column flooding and heat transfer conditions can be calculated from measurements and used to establish operating limits. Maximum recovery is achieved by controlling column energy flow as close to the limits as possible. This control is implemented by maximizing column energy flow until restricted by a constraint controller with setpoints established at each of the limiting values.

In another example, the heating capacity of a furnace or boiler may be limited by some maximum temperature above which structural materials begin to lose integrity. Maximum production is frequently determined by such utility limits. Optimum operation is obtained by maximizing furnace load until temperatures increase to just within maximum limits.

Boilers, for example, can be controlled so that they can operate up to but not above their maximum capacity. Pressure is usually the control measurement that determines fuel flow to a boiler. The temperature of a metal boiler tube, a monitored variable, is measured, and this measurement is used as a feedback signal for an override controller that overrides the pressure controller, thus reducing fuel flow when tube temperature exceeds the override controller temperature setpoint. Other limiting measurements can be added to the control scheme to form a constraint control system.

The override temperature setpoint is set to a soft limit value below the boiler tube metal failure temperature which is the hard limit. Temperatures above the soft target are said to be in the limit violation direction from the soft target.

Fuel flow is adjusted to control either boiler pressure or maximum tube temperature and is the common process parameter. Either pressure or tube temperature can be controlled at an instant of time, but not both. A constraint controller provides a means of combining a pressure controller and a maximum tube metal temperature controller.

The control function of temperature overriding pressure control can be implemented through a constraint controller that adjusts the setpoint of a fuel flow controller. In a digital control system, the constraint controller selects the appropriate adjustment from an array of adjustments formed from the outputs of the pressure controller, temperature controller and any other controller included in the constraint controller. The array of adjustments represents the results of the control algorithms operating on the setpoint and monitored variable's measured value at an instant of time for each of the individual controllers constituting the constraint controller. These instantaneous values are stored in a digital control system for calculation and access.

Many process conditions are interrelated so that process adjustments, made to control one condition, affect other conditions. Constraint control systems regulate a selected group of process conditions (monitored variables) at optimal values and within processing and equipment limitations.

A constraint controller manipulates a single process adjustment in response to a multiplicity of process conditions or measurements. The constraint controller controls only one process condition at an instant of time. The constraint controller controls at some primary optimal condition or at the most limiting condition.

One primary optimal measurement in distillation, for example, is the concentration of product in a recycle stream. The optimal composition setpoint is calculated by balancing recovery energy costs against value of the recovered product.

The most limiting condition is the condition whose limit would first be violated in attempting to adjust the process to operate at the primary optimal condition. The mechanisms of associating process adjustments with constrained process conditions and the switching of control to respond to different varying conditions, is the subject of this invention.

A constraint controller is a combination of override controllers each interrelated with another and having the ability to override another and to operate in order to maintain the process conditions at an optimum value or at a constraint setpoint that is near, but within, a process limitation. The individual override controllers each develop an output signal value that will regulate the process so as to control the measurement at the setpoint.

Only one of the individual override controllers can be successful at controlling its measurement at setpoint because a constraint controller has one output that adjusts one degree of process freedom. Accordingly, some rational must be used to select the individual controller output signal that is to be used to adjust the process.

The standard implementation of constraint controller has been to select as the output of the constraint controller either the highest or lowest of the individual controller output signals (adjustment array). Either a high or a low "select" is used depending on which action will move process conditions safely away from the limits. The nonselected controller output signals must track the constraint controller output so that they will promptly assume control when their measurement moves toward the limit violation side of setpoint. Herein lies a problem.

Output tracking, applied continuously to the nonselected individual controllers, causes each controller to be poised and ready to assume control. This would appear to be a good control objective, but the practical result is an unresponsive system. Measurement variations cause frequent selection switching among the controllers. Outputs in only one direction are passed through the selector resulting in an excessive distorted gain. The magnitude of the gain increases with increasing frequency of the measurement variation. As a consequence, the individual controllers must be "detuned" for constraint controller stability, which detuning produces poor control response when measurements are such that one controller remains selected, over some extended period.

Consider, for example, use of high selection of the output of two velocity mode digital controllers. If both outputs are increasing, the greater change in output is selected at each control execution. If the outputs vary, so that the selected output switches between the two controllers, then the sum of the selected change in outputs is greater than the change in output of either controller over the summation period. The effective gain of the constraint control is greater than the gain of either controller.

Consider a second example wherein both outputs are increasing on the average over some period and one of the outputs has an oscillation imposed on it so that it may increase or decrease between executions. In this example, then the constraint controller effective gain can be much greater than in the first example. The contribution to the summed output of the oscillating controller can be a factor greater than one times the net change in oscillating controller output. This occurs because all of the increases and none of the decreases are summed. The effective gain is thus a function of the control disturbance frequency.

Any controller tuned unintentionally by a process disturbances will cause problems. This explains why, in practice, it is found that override and constraint controllers are detuned relative to single loop controllers. If the control of a single constraint variable is tuned as a single loop controller, it probably will be unstable in constraint control. The insidious feature is that it may not go unstable until constraints are reached or an oscillating disturbance is encountered.

The preemptive constraint control of this invention, solves this problem providing responsive control independent of process disturbance frequency. The preemptive feature of the control takes control action prior to exceeding a limit setpoint, when it is projected that the limit variable would otherwise exceed the limit. Deviations above soft limit setpoints are thereby reduced, enabling soft limits established closer to "hard" constraints. The preemptive constraint control of this invention increases profit by operating closer to constraints.

SUMMARY OF THE INVENTION

Multiple controllers are combined operatively in a preemptive constraint control system so as to provide responsive regulation of interrelated process conditions keeping all of the conditions within process and equipment limitations and, where possible, at or very near optimal values. The constraint controller generates one output signal that may be split, modified or used directly to adjust the process so as to effect the interrelated process conditions. This adjustment generally is directed to manipulate one degree of freedom in the process, to which the constraint controller process conditions are considered to be dependent variables.

This invention is not restricted to a single constraint controller, as described immediately preceding, but also includes interconnection of multiple constraint controllers in a cascade control structure or connection of constraint controllers to other control modules or control technology, utilizing the methodology described herein. In the cascade control structure, the output adjustment from one constraint controller adjusts the setpoint of one of the individual proportional integral derivative (PID) controllers in a second constraint controller. Alternately, the output of the first constraint controller is treated as though it were the output of a PID controller in the second constraint controller.

A second degree of freedom for process manipulation may exist that affects process conditions certain of which may be the same process conditions affected by the first degree of freedom. A second constraint controller can be established to manipulate the second degree of freedom. According to this invention, the process interactions between the two constraint controllers are coordinated through the proper structuring of individual controllers in each constraint controller so as to regulate interrelated conditions expressed as limits. These limits can be ratios or other combinations of measured conditions that account for and accommodate measurement interrelationships and process requirements. Other degrees of freedom may be coupled in a like manner.

In the present invention, a series of individual controllers, each providing proportional, integral, derivative and other individual control actions, is combined to form a preemptive constraint controller to control interrelated variables. Either the highest or the lowest of the individual controller outputs is selected as the preemptive constraint controller output. Either high or low is chosen based on which action will cause the measurements to move away from limit violation (opposite to the limit violation direction).

An infeasible control situation can occur in a cascade control structure containing both a minimum select constraint controller and a maximum select constraint controller. The infeasibility occurs when measured values of monitored variables exceed setpoints in the limit violation direction in both constraint controllers at the same time. Opposing adjustments are required to satisfy both constraint controllers, thus, the infeasibility. This invention handles the infeasibility by inhibiting adjustment and activating an alarm to alert operating personnel to the infeasibility.

Constraint controllers, single (PID) controllers and simple ratio controllers as well as other controllers are incorporated into a cascade control structure according to control application requirements.

A single controller is used in a cascade structure to regulate a process to desired value. The output adjustment developed by the single controller is cascaded to constraint controllers. The setpoint of a single controller is set to a desired value rather than a limit value. There is no limit violation direction for the single controller. The constraint controller can override single controller output adjustments, in either direction in order to reduce constraint control limit violation without causing control infeasibility.

One aspect of this invention is in the use of output selection of multiple individual controller outputs, calculated as described herein, the effect of which causing the output to be selected only when necessary to control the most constraining process condition. Either the highest or the lowest of the output values is selected. A second less constraining condition, with its measurement on the limit violation side of setpoint, will not be selected, even if the measurement oscillates, because the relationship between the measurement and the output that produced the measurement, is maintained. Output tracking destroys this relationship. The relativity is maintained because the proportional term changes the output for changes in measurement and the reset term relates the output to a previous time that the individual controller was selected. This technique avoids the excessive manipulation of the process for every measurement variation in the direction of the limit, as described previously.

The setpoints of the PID controller constituting a constraint controller are set to soft target values some distance from and on the non-limit violation side of the hard target. The soft target is established so that it is statistically improbable that the hard target will be violated by setting the distance between hard and soft target at a factor times the measurement's standard deviation during a representative recent period.

This invention provides a means of comparing the severity of constraint violation of measurements with different ranges and units.

Output tracking is necessary in conventional constraint and override controllers to prevent reset windup. This invention prevents reset wind-up by disabling error integration, for unselected controllers, except when the measurement is on the limit violation side of setpoint. A nonselected reset term integrates error (deviation of monitored variable from setpoint) on the limit violation side of setpoint. In this way, the constraint may eventually be selected if the limit violation persists too long. Once begun, the integration continues, when the measurement is not on the limit violation side, until the nonselected reset term reaches or passes through zero. This prevents reset windup of the nonselected reset term.

As in the standard positional control algorithm, error is integrated in a reset term when the individual controller is selected and outputting. In this invention, integration stops when the controller is no longer selected and the reset term is back calculated from the current output upon initialization, when the constraint controller is first switched on.

Premature selection is prevented through calculation of an output "pseudo measurement" for the unselected individual controller. The pseudo measurement is the unselected measurement required to produce the current constraint controller output. This pseudo measurement is back calculated from the constraint control output and the individual controller control equations. Whenever the current measurement is on the limit violation side of setpoint, the difference between the pseudo measurement and actual measurement at last execution is subtracted from the current measurement and the result is used in place of the measured value to calculate the current individual unselected controller output. This prevents the individual nonselected controller from being selected until its measurement violates the limit by more that the pseudo measurement. Thus, the nonselected controller does not take control when output by the selected controller should be adequate to eliminate the nonselected controller error. The pseudo measurement thus maintains a relationship between the constraint controller output, the individual controller output and the individual controller measurement that prevents unnecessary switching of selected controllers while the selected controller is responsively controlling at the most constraining setpoint.

In the following description, the controllers are described as positional mode digital controllers; however, the invention applies equally well with, for example, velocity mode control systems. The main difference, between the two modes, is that in velocity mode, reset integration occurs in the setpoint receiving the output. In positional mode, the reset integration is summed and stored in a term used in the positional control calculation. This stored sum is utilized to effect the desired control result of this invention. Output adjustments, measured values, pseudo measurements and setpoints are stored in a digital system. The proportion mode constraint control of this invention is applicable to a velocity mode system since the velocity mode system retains positional values for setpoints. The positional mode preemptive constraint controller is made transparent to a velocity system through proper interfacing.

The preemptive feature of this invention develops constraint control output, to prevent limit violation, in two ways when there is an increased probability of a limit being violated. In one way, the rate of change of the measurement (a derivative type control response) is calculated and the absolute value compared to a threshold value. If the threshold value is exceeded the derivative term is included in the individual controller output. This derivative action may optionally be taken only if the eventual resting value is beyond the limit, or, optionally, if the measurement is within some minimum approach to the limit or beyond the normal distribution of the measurement. The described derivative action makes adjustments to the process to prevent limit violations when the measurement is far from the limit and setpoint, in the unlimited direction, and when the measurement is rapidly approaching the limit. The threshold value can be set to minimize the effect of high frequency, low amplitude variations that are particularly troublesome in sample data digital systems preventing the controlled process from reaching acquiescent steady state. Setting the threshold value to slightly more than three times the current standard deviation prevents response to normal variation so that the control can identify and respond to excursions that will probably violate the setpoint. Control response is achieved by adding the output change, generated by derivative action to the last constraint controller output. This added chance is the rate portion of the total output due to rate of approach to a limit. The derivative term will not be added if this individual controller was selected during the last execution.

A standard variation range is established by both adding and subtracting a factor times the standard deviation to the measurement mean. Measurement variation beyond the standard deviation is used to indicate process transition requiring special control action.

The second preemptive action results through prediction of unrealized change in measurement from past changes in constraint controller output. This unrealized change in measurement, when added to the current measurement, predicts the measurement eventual resting value with no further disturbance. If this resting value exceeds the limit then the correction in output required to prevent limit violation is developed for the individual controller, using the process gain, a tuneable projection gain and a projection reset time. The difference between the resting value and setpoint is used as error in a control algorithm calculation to modify adjustments of the common process parameter. The unrealized change in measurement is calculated from previous constraint controller outputs stored in an array of adjustments implemented during a period of at least two time constants plus dead time into the past.

Step test response data is used to develop an array of fractions or factors, one fraction for each output over the calculation period. The fraction represents the current unrealized measurement for the output at the corresponding fixed time into the past. Recent outputs will have fractions near 1, while the fraction for one time constant plus dead time should be near 0.368. The unrealized measurement is sum of the measurement and fraction products divided by the process gain. The fractional values (factors) may be adjusted to more accurately represent the expected response.

Factors near current time may be negative to accommodate initial inverse response. The factors affect control, and therefore, can be further changed to produce a desired dynamic response.

The preemptive control has an optional self-adjusting feature that correlates deviation of the measured values beyond the eventual resting value in the limit violation directions. The eventual resting value factors are updated through an adjustable filter so as to reduce deviation from eventual resting value. Factors are updated only when statistically significant deviation is present as determined by the measurement varying beyond its standard variation range.

A preemptive integral output is calculated from the difference between the resting value and the setpoint, using the process gain and a projection integral time tuning constant. The integral output is added to the constraint controller output by summing into a special constraint controller reset term which is initialized to a value of zero, or "zeroed," at each constraint switching. This "integral-only" control is best because the resting value represents full response of previous outputs and projects control offset. Configuration options determine whether the integral output is summed in the individual controller reset term, in the constraint controller reset term, or in both. The preemptive integral output of a selected individual controller may optionally be added to the individual controller reset term (but not the constraint controller reset term). The total integral action of the selected individual controller will thus contain one part due to actual measurement and one part from the unrealized measurement.

Optionally the unrealized measurement can be calculated based on the difference between the constraint controller and individual controller outputs in place of the summation of past outputs.

The primary objective of this invention is to provide a means of controlling a process with a multiplicity of measurements dependent on one process parameter, so that only the most constraining of the measurements manipulates the process in such a way that the performance of each individual controller selected is equivalent to the performance if there were a single controller controlling only one measurement, the most constraining variable. A secondary objective is to manipulate the process to prevent a measurement, that is within a process constraint limit, from excessively exceeding that process constraint limit when it is projected that it would do so without the corrective manipulation.

The invention as presented can be translated into rules and implemented in a rule based "fuzzy logic" control system.

DESCRIPTION OF THE PREFERRED EMBODIMENT

The method of preemptive constraint control can be implemented in a computer based control system by executing a series of steps, calculations and logic. The executions reoccur on a schedule to develop process adjustments that affect process conditions so as to control the conditions. The adjustments are applied to adjustable process parameters. The conditions are measured and the measurements are used in a control equation to develop a control output that is a process parameter adjustment.

Figure 1:
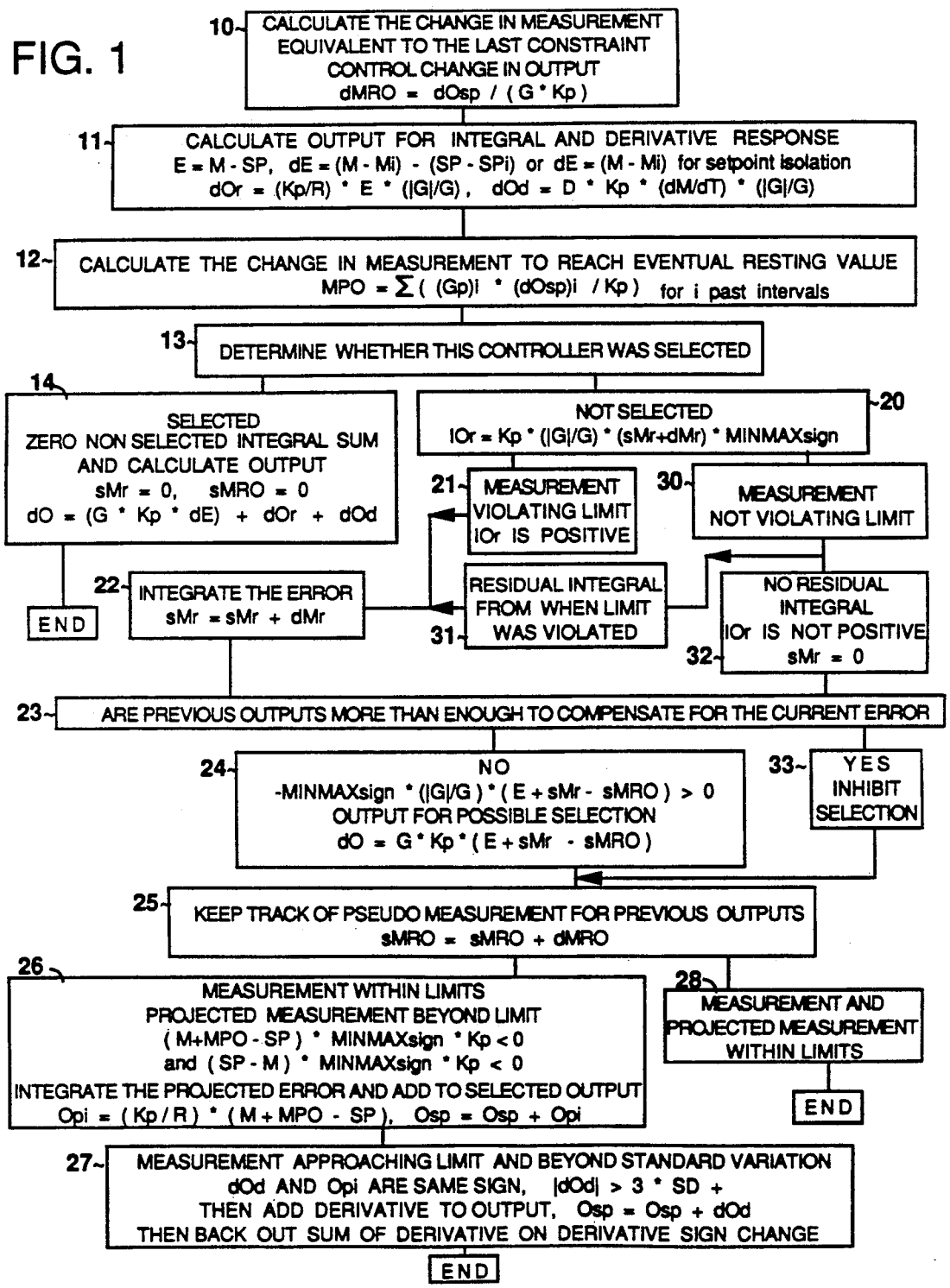
FIG. 1 is a flow chart showing certain velocity mode control expressions, in accordance with the preemptive constraint control of the present invention.

FIG. 1 presents the steps, calculations and logic used to develop changes in output (dO), for each individual controller in a preemptive constraint controller. The control equation is the bottom line of Block 14 and can be viewed as the sum of three outputs, one (G * Kp * dE) for proportional control, one (dOr) for integral control and one (dOd) for derivative control. The proportional output is computed from "G" the control gain, "Kp" the process gain, and dE, the change in control error.

Terms may take on different characteristics depending on the usage. A process condition can be considered as a positional measurement M or as a change in measurement dM. The lower case "d" preceding a variable indicates that the term is the change in a value since the first preceding execution. A lower case "s" preceding a variable indicates that it is a sum of values computed in previous executions. A lower case "i" denotes integers representing previous executions in time. The functional designators "d", "s" and "c" denote different characteristics of a process value.

A constraint controller is a combination of individual controllers, each individual controller responding to one measurement and using a number of control characteristics to develop a process parameter adjustment that controls the measurement, bringing the measured condition to a setpoint. The controllers are combined by selecting either the maximum or the minimum of all the adjustments developed by the individual controllers. The selected adjustment is used as the constraint control adjustment for this execution. The controller developing the selected measurement is the selected controller. All other controllers in the constraint controller are not selected.

Block 10 shows calculation of the unselected individual controller measurement change (dMRO) necessary for the controller to produce an adjustment equal to the first preceding process adjustment (dOsp).

Block 11 defines values used in the control equation where:
M is the current measurement,
Mi is the previous execution measurement,
SP is the current setpoint,
SPi is the previous execution measurement,
E is the control error,
dE is the change in error since last execution and may include or exclude the effects of changing setpoint,
R is an integral tuning constant,
G is the control gain,
|G|/G is the control action
+1 is direct action when increasing measurement requires increasing output,
−1 is reverse action when increasing measurement requires decreasing output,
Kp is the process gain,
dM/dT is the measurement rate of change with time,
dOr is the change in output resulting from integral control, and
dOd is the change in output resulting from derivative control.

Block 12 shows the expected change in measurement (MPO) required to reach the measurement eventual resting value at steady state, based on past process adjustments where:
(Gp)i is an i array of factors, each factor representing the current unrealized effect of the process adjustment at the i past execution, i varying from first preceding for a suitable number of past time elements,
(dOsp)i is an i array of past process adjustments corresponding to the period defined above, and
Kp is the process gain.

Block 13 identifies whether an individual controller was selected at the conclusion of the first preceding execution. If the individual controller was selected, the steps of Block 14 are executed.

Block 14 shows that an integral measurement summation term (sMr), developed to promote selection of an unselected controller because of measurement offset, is zeroed for initialization. The sum of the change in measurements resulting from output (sMRO), developed in Block 10, is also initialized. A process output adjustment (dO) is developed for the individual controller. Each of the "END" blocks after blocks 14, 27 and 28 denotes completion of the calculations for an individual controller for a given execution.

The steps of Block 20 are executed if the individual controller was not selected when the first preceding execution concluded. An indicator (IOr) is developed that is positive when the measurement is on the limit-violating side of setpoint. MINMAXsign is an indicator set to −1 if the constraint controller selects the minimum adjustment and +1 if the constraint controller selects maximum adjustments. If IOr is positive, the logic path flows through Block 21 to Block 22 to integrate the measurement offset from setpoint.

The path is through Block 30 when the measurement is sufficiently on the nonlimit violation side of setpoint. Block 31 shows that if there is a residual in the measurement offset sum (sMr), the path is to Block 22, where the residual may be moved toward zero. If sMr passes through zero, the path is to block 32 on the following execution wherein sMr is set equal to zero.

Block 23 is a common path from Blocks 22 and 32. Block 23 judges whether controller selection should be encouraged or inhibited based on the relative values of "E", "sMr" and "sMRO". True false evaluation of the first expression in Block 24 determines the path. If the statement is greater than 0, i.e. true, the previous outputs are not more than enough to compensate for the current error and the path is through Block 24. Selection is encouraged by developing an output adjustment (dO) as shown on the bottom line of Block 24. This individual controller adjustment is developed for possible selection by the constraint controller.

If the measurement is adequately far from the setpoint on the nonlimit violation side, that is, the previous outputs are more then enough to compensate for the current error, then the path is through Block 33 and selection is inhibited.

Block 25 performs the summation of changes in measurements resulting from previous outputs (sMRO) and determines whether the measurement and projected measurements, or pseudo measurements, are on the nonlimit violation side of setpoint. If so, the individual controller processing is complete as indicated by the path through Block 28.

Block 28 presents the steps performed when the measurement is on the nonlimit violation side of setpoint but recent process adjustments are projected to cause the measurement to move to the limit violation side of setpoint. This is the situation if the first two logic expressions in Block 26 are both found to be true. The offset (M+MPO−SP) of the projected measurement from setpoint is sued to develop an integral adjustment (Opi). The expected resting value is (M+MPO) where MPO is a characteristic of the expected resting value. The constraint controller selects from all individual controller adjustments developed through the current execution and "Opi" is added to the constraint controller selected adjustment, the result being the constraint controller output adjustment to the process.

The calculation of MPO is shown in Block 12, before the separation of the logic path and is not used in every path. The calculation of other terms is shown in particular blocks for clarity of presentation but may be calculated in other blocks.

Blocks 26 and 27 are shown positioned after block 25 for clarity of presentation, but require the term Osp, an adjustment characteristic selected from individual controller adjustments. All of the individual adjustments must be available for proper functioning of Blocks 26 and 27.

Block 27 adds a derivative based output to the final output adjustment if the measurement is projected to move to the limit violation side of setpoint and is rapidly moving in the limit violation direction. The judgement as to rapid motion is made relative to a standard variation (3 * SD+) defined as three times the standard deviation of the output+a small factor. The outputs thusly added are summed so that any residual sum that exists when the derivative crosses zero is used to change the output. This assures that the net effect on the output is zero, when the measurement is no longer moving rapidly.

The preferred embodiment is discussed hereinafter in terms of control of a steam boiler. However, the preemptive constraint control of the present invention may be utilized for control of other processes as well.

Regulation of the combustion process, such as in a furnace or boiler, in an efficient and safe manner, requires proper adjustment of both fuel and air flow to the combustion zone. The fuel and air flow are two independent manipulated variables. Adjustment of fuel and air must be made to maintain the combustion process, prevent accumulation of explosive volumes of unburnt fuel, avoid implosion due to low internal pressure from sudden reduction in gas inventory, limit equipment temperatures to prevent loss of structural integrity, respond to load changes, avoid combustion that produces pollution and maximize utilizable heat per unit of fuel consumed. These requirements represent numerous limits and constraints to adjustment of fuel and air flow to the combustor.

Figure 2:
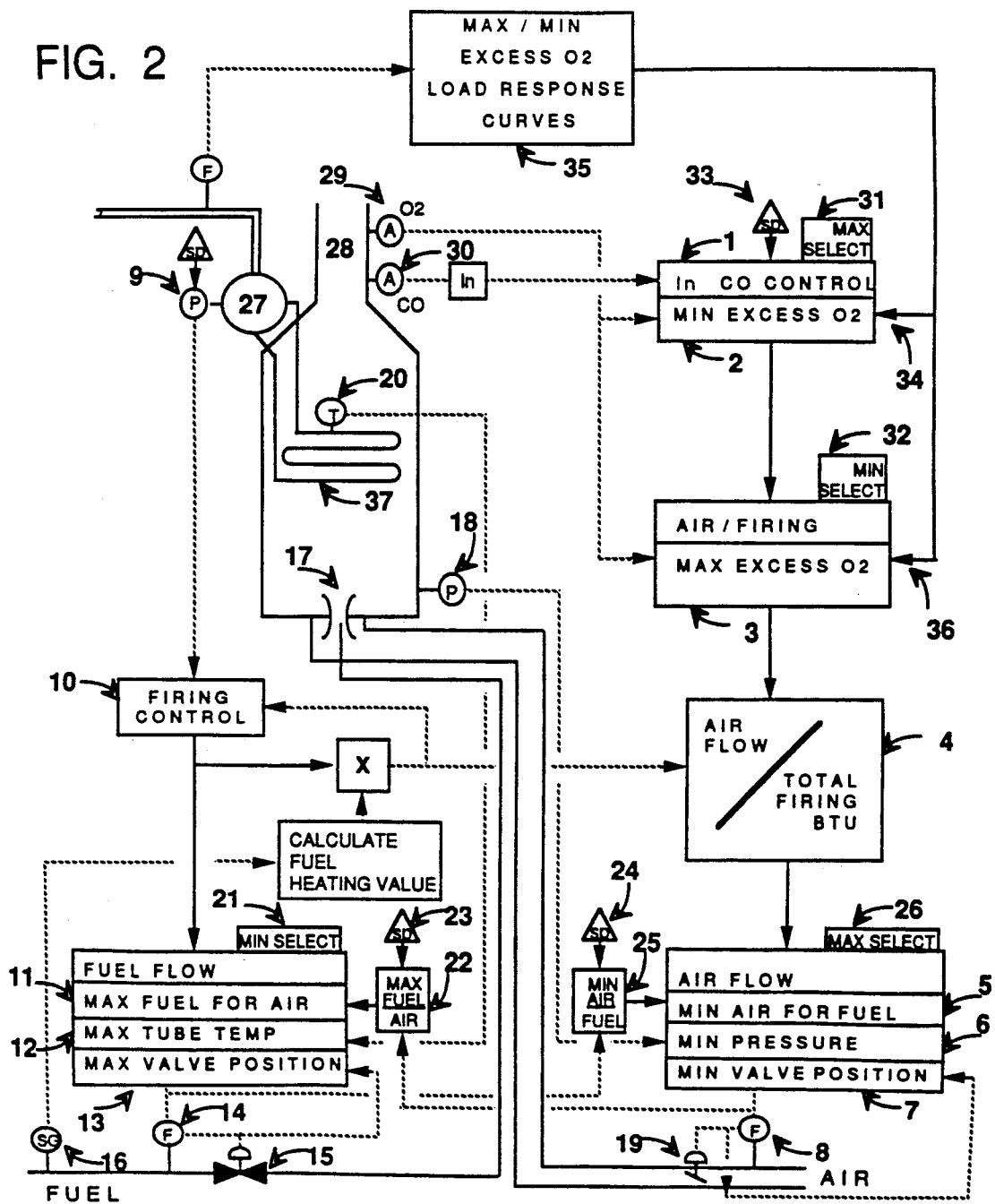
FIG. 2 is a diagrammatic representation of application of the invention in control of combustion in a steam boiler.

FIG. 2 depicts a steam boiler and the control system embodiment of this invention, the control system is used, for example, for boiler combustion control. Fuel and air are mixed in burner 17 and enter the fire box of the boiler where the mixture ignites to form a flame emanating from burner 17. The products of combustion exit the boiler from exhaust stack 28. Steam drum 27 is partially filled with water which circulates through tubes 37 arranged in the boiler to absorb radiant heat from the flame and convective heat from the combustion gases. The heated water boils and steam and water circulate back to the steam drum where the steam is separated from the water. Steam exits the drum at a flow rate determined by the total demand of various users. Steam drum pressure meter 9 indicates the imbalance between steam supply and demand by increasing when supply exceeds demand and decreasingly when supply is less than demand.

In FIG. 2, flow controllers 8 and 14 are depicted measuring flow and manipulating a fuel valve 15 and air damper 19 to control the fuel and air flow to a burner 17. The valve 15 and damper 19 are modulated to regulate the measured fuel flow and air flow to flow setpoint values. A boiler steam drum 27 pressure controller 9 is shown that senses changes in boiler demand and adjusts boiler firing, through the constraint control system of this invention, so as to provide safe efficient operation of the boiler. Carbon monoxide 30 and oxygen 29 measurements of the exhaust gas in the boiler stack 28 are provided as measurement signals to carbon monoxide controller 1, the minimum excess oxygen controller 2, and maximum excess oxygen controller 3 in the preemptive constraint control system. Also shown are controller interconnections and individual controllers that cause the boiler to operate very close to the most constraining limits and within all limits of maximum boiler tube temperature 20, minimum fire box pressure 18, maximum fuel to air ratio 22, minimum air to fuel ratio 25, maximum fuel valve 15 position and minimum air damper 19 position.

The combustion process in practice is never perfectly efficient. Complete combustion of the fuel is not achieved with the addition of air containing stoichiometric quantities of oxygen. Air in excess of the stoichiometric amount must be provided for complete combustion otherwise unburnt fuel and carbon monoxide (CO) will exit in the exhaust gases. Excess oxygen, ranging from 6% to 1% or lower, may be provided for complete combustion, depending on furnace design and operating load.

Addition of too much excess air decreases efficiency since the excess air exits at a higher temperature than it enters wasting heat. Too little excess air causes incomplete combustion and smoke. The optimum excess air varies with furnace loading decreasing with increasing load due to improved air fuel mixing at maximum design loading. Exhaust carbon monoxide (CO) concentration provides a good measure of combustion efficiency independent of loading. Maximum combustion efficiency is realized at a concentration range of 150 to 300 parts per million of CO. At fixed load, the change in CO concentration with excess air is very nonlinear. The CO concentration goes up very rapidly as excess air approaches zero and goes down very slowly as excess air increases beyond the optimum. This nonlinearity makes optimum control of excess air, based on control of CO concentration, very difficult. The optimum concentration of oxygen in the exhaust gas varies with load so oxygen concentration is not a good optimum control measure.

This invention provides optimum efficiency control by adjusting excess air in response to the natural logarithm of carbon monoxide measure provided automatically by known measurement devices.

The natural log of carbon monoxide (1 n CO) computed from the CO measurement is controlled to an optimal setpoint of about 5 which corresponds to about 150 PPM carbon monoxide in the exhaust. Control of 1 n CO is achieved through this invention by manipulating dampers, air feed or exhaust blowers or other furnace adjustments that affect air flow to the combustion zone. The calculated 1 n CO is provided as the measurement for individual controller 1 in the constraint controller 31. Setpoint 33 is set to the optimum 1 n Co.

Under increasing load conditions, air flow must increase at least as rapidly as fuel to prevent accumulation of uncombusted fuel. If the excess air is to deviate from the optimal value, due to the dynamics of the change, it is prudent to deviate in the direction of excess air rather than too little air to prevent smoking or potential explosive accumulation of unburnt fuel. Too much air is preferred since the only negative effect is loss of efficiency. The control problem that this presents is that the carbon monoxide concentration drops to values too low for accurate measure. This invention provides a control transition to a second individual controller with minimum deviation from optimum combustion and without discontinuity when carbon monoxide drops to an immeasurable value. The second controller is a minimum exhaust oxygen controller.

The second controller controls an automatic measurement 29 of exhaust oxygen concentration to a minimum allowed oxygen soft setpoint 34. A decreasing carbon monoxide concentration will cause controller 1 output to decrease air flow. Controller 2 prevents the air flow reduction from reducing exhaust oxygen below the minimum allowed value. The maximum of the outputs from controllers 1 and 2 is selected for output to further constraint control processing. Controller 2 serves to limit both the rate and extent of air reduction and, through the preemptive feature, may take control before the minimum allowed value is reached. The expected resting value factors are adjusted based on furnace control response dynamics.

A low oxygen "soft" target is established relative to a low oxygen "hard" limit. The hard limit is the value that should not be violated while the soft target is the second controller setpoint 34. Normal control response will cause oxygen concentrations on either side of the soft limit. The soft setpoint is manually chosen to be comfortably within the minimum oxygen hard limit, or optionally automatically set at slightly more than three standard deviations within the minimum oxygen hard limit. This provides automatic control adaptability to changing process variability.

The safe low oxygen hard limit varies with furnace load. Furnace testing or design data defines the relationship of the hard limit value with load. Equations 35 for this relationship are used to calculate the hard limit based on measured or projected load. Load is inferred from a measurement that relates to the amount of combustion such as steam flow from a steam boiler. This hard limit is used, as described above, to calculate soft limit setpoints 34 and 36 for constraint control.

The output of the unselected controller does not track the selected output. Error integration for the unselected controller, is limited so that it effects control only for a persisting violation of a limit.

When the constraint controller is turned on, initializes and carbon monoxide control is selected, a change in oxygen concentration is calculated that would be required to produce the selected carbon monoxide controller output. This change in output is back calculated through the control equations of minimum excess oxygen controller 2 to obtain the pseudo change in oxygen. The change in oxygen is calculated for each change outputted by the constraint controller 31 and 32 to the air flow and the changes are integrated in controller 2 pseudo oxygen summation term (POST2).

POST2 is subtracted from the oxygen measurement used in the control equations of minimum excess oxygen controller 2. This prevents minimum excess oxygen controller 2 from calculating an output that would be selected until after the oxygen analysis 29 moves toward constraint violation enough to equal the output already applied by the carbon monoxide controller 1. Thus, compounding of outputs by the two controllers is prevented. Previous output by the carbon monoxide controller 1, that will aid in reducing violation of the low oxygen limit soft setpoint, is recognized by minimum excess oxygen controller 2.

While the carbon monoxide controller 1 is selected and controlling, minimum excess oxygen controller 2 selectively integrates deviation of oxygen below the soft limit. Output generated by the carbon monoxide controller 1 may produce a value of POST2 that permits an oxygen measurement 29 below the soft target without selection of excess oxygen controller 2. This deviation of oxygen below soft target is integrated. The oxygen deviation integral is included with the oxygen measurement for the control output calculation of minimum excess oxygen controller 2. In this way, prolonged deviation of oxygen below the soft limit will eventually cause selection of minimum excess oxygen second controller 2. If the oxygen measurement increases to above the soft limit 34 before controller 2 selection, integration continues until the absolute value of the integral reaches zero. When zero is reached, integration of oxygen above the soft limit ceases.

The distance between the point of air entry to the furnace or boiler and the carbon monoxide and oxygen measurement point, causes a transport lag dead time between air manipulation and measurement of the resultant change in composition. This dead time plus the mixing of combustion products with the inventory of gas in the furnace or boiler, causes a gradual change in measured composition for a step change in air flow. This gradual change or response curve can be characterized by a process gain (eventual change in measurement per change in air flow) and a series of fractions representing portions of the change in measurement realized at respective time intervals from the change in air flow. This invention saves the most recent series of changes in air flow for a period of at least two process response periods plus dead time and lag. Summing the product of the fractional series times the change in air flow series yields a projected ultimate resting value of oxygen measurement due to past changes in air flow. A second fraction series similarly characterizes the carbon monoxide ultimate resting value.

The preemptive constraint control feature of this invention predicts eventual resting values of oxygen concentration below the soft limit due to decreases in air flow caused by control action response to low carbon monoxide concentration. This invention changes air flow based on the oxygen predicted resting value. The changes in air flow can be calculated based on standard proportional, integral and derivative control response to the predicted eventual resting value. A special feature of this invention is the simplicity afforded by using integral only control for this part of the preemptive feature. The eventual resting value represents oxygen control offset and as such is controlled perfectly by integral only control.

A preemptive optional feature sets POST2 equal to zero when the predicted oxygen eventual resting value drops below the soft limit. This serves to allow the minimum excess oxygen controller 2 to assume control of the air flow when oxygen excursions below the soft limit are predicted.

There are two problems associated with the application of derivative control action, one related to measurement noise and the other to switching between controllers using derivative. When the carbon monoxide begins to decrease derivative control action causes a reduction in air flow. If the carbon monoxide were to stop decreasing and remain at a new low value, the air flow would be increased, due to derivative action, by exactly the same amount that it had previously been reduced. If, however, minimum excess oxygen controller 2 assumes control before the carbon monoxide stops decreasing, the previous carbon monoxide derivative air flow reduction is not canceled by a carbon monoxide controller 1 derivative increase. This invention resolves this problem, on transition, by increasing air flow to zero the carbon monoxide derivative sum and implementing a derivative move for the oxygen controller as if the oxygen concentration was constant at the last previous execution.

Measurements may vary rapidly about a mean value due either to noise or actual process variation. Air leakage, down stream of combustion, combined with turbulent flow can cause the oxygen measurement to vary about a mean, while the concentration leaving the combustion zone is constant at the mean. Since limited amplitude fluctuations about the mean is of no consequence, a control system that ignores the fluctuations is of value. This invention provides such a system.

The oxygen concentration standard deviation, for a representative preceding interval, provides the criteria for distinguishing between inconsequential variation and a measurement change requiring derivative control action. Derivative control action is inhibited when the measurement is within a factor of the standard deviation. The factor is adjustable and standardly set somewhat greater than a value of three. When oxygen concentration varies from the running mean of a preceding interval, by more than the factor of standard deviation, a contribution to output is calculated from the derivative portion of the control equation and a summation of the derivative control output is begun. When the oxygen is again within the factor of the running mean, derivative control output and summation continues until the sign of the derivative reverses while the measurement is within the factor of the running mean. At sign reversal a final derivative output is developed to zero the derivative summation term, and for following execution, derivative output is inhibited as before. Derivative control action is similarly provided optionally for carbon monoxide control and other controllers in the preemptive constraint control system. The derivative control action is optionally based only on changes in measurement rather than on changes in error to avoid responding to changes of setpoint.

Proportional and integral control action can be similarly inhibited in order to allow the process to reach a quiescent steady state.

This invention selects the maximum change in output, developed by the first and second controllers 1 and 2, respectively, for further constraint control processing. Selecting the maximum change, enables the carbon monoxide controller 1 to regulate excess air addition at the optimum value except when this regulation would violate the minimum oxygen limit. Selecting the maximum outputs developed as described above, enables override of carbon monoxide controller 1 by the minimum oxygen controller 2, to prevent low excess oxygen in the furnace or boiler. The selected maximum output of controllers one and two, is further processed by the constraint control of this invention to limit exhaust excess oxygen to a maximum concentration 36.

Further constraint control processing may result in selection of a controller different from the ones discussed above. When this occurs, information is passed back up the cascade control structure so that the actual, final output can be used in the calculations for all unselected controllers.

Changes in furnace load or fuel composition can cause unnecessarily high increases in air flow in response to high carbon monoxide measurements. Excessively high air flow reduces efficiency and can impair furnace capacity. A third controller is employed in the constraint control of this invention to limit unnecessarily large increases in air flow by controlling the exhaust maximum oxygen concentration 29. A maximum acceptable oxygen limit is calculated 35 for the current furnace load from design and operating information. This maximum acceptable oxygen limit is automatically entered as the third controller setpoint 36 and automatically changes with furnace loading. The preemptive constraint control individual controller technology described previously is applied to the maximum excess oxygen controller 3. The minimum output of controller 3 and the previously selected maximum of the outputs of controllers 1 and 2, is selected for further constraint control processing.

Selection of both minimum excess oxygen controller 2 and maximum excess oxygen controller 3 indicates a conflict of oxygen limit setpoints 34 and 36 if neither output was the result of preemptive control action. If the oxygen concentration is beyond the soft limit of only one of controllers 2 and 3, the output of the limit violation controller is used. If the limit setpoints conflict, the condition is alarmed and no change in output is implemented.

The selected output of controllers 1, 2 and 3 is supplied as the setpoint to simple ratio 4. The air to heating load is the ratio controlled. The air flow output of this ratio controller is passed on to further constraint control processing. The ratio controller develops an output by multiplying the setpoint by the current BTU heating load. This provides feed forward control. The current BTU heating load is calculated from the current fuel flow target and an inferred or direct measure of fuel BTU value. The output of controller 4 is the air flow target.

The simple ratio function of controller 4 can optionally be implemented as an integral only controller. The air flow target, the fuel flow target and the inferred or measured fuel BTU value are used to calculate an air to heating load ratio as the measurement for the integral only controller. The integral time is set equal to the execution frequency. The integral controller gain is set equal to the heating load to air ratio, the inverse of the calculation.

Changes to the air flow target are considered with the respective outputs from controllers 5, 6 and 7 for maximum selection in constraint controller 26. The setpoint of the fifth controller is the minimum air flow allowed for the current fuel flow. The measurement for controller 5 is the air flow controller setpoint. The setpoint of controller 5 is calculated by multiplying the minimum allowed ratio 24 of air to fuel by the current fuel flow 14. The measured fuel flow is used or optionally the fuel flow setpoint if the fuel measurement is a "noisy" signal. Reduction of air flow is thus prevented from dropping below the amount required for proper combustion of the current fuel flow. A fuel flow controller deviation alarm interlock is provided, when fuel flow target is used for the fifth controller 5, to prevent decreasing air flow when fuel flow controller 14 is not controlling.

The setpoint of controller 6 is the minimum furnace pressure. Controller 6 prevents implosion due to a reduction in forced draft drive or dampers.

The setpoint of controller 7 is the minimum position of the air flow manipulator. The manipulator position is feed back as the measurement of controller 7 to prevent air flow controller 8, wind up.

Steam drum pressure controller 9, is used in steam generating boilers to sense steam demand. The output of the steam pressure controller adjusts BTU heating load controller 10. The measurement for this integral only heating load controller is calculated from the fuel flow target and the measured or inferred fuel BTU heating value. Feed forward is thus provided for changes in fuel heating value. The output of heating load controller 10 is the fuel flow target.

Changes to the fuel flow target are considered with the outputs from controllers 11, 12 and 13 for minimum selection. The setpoint of controller 11 is the maximum fuel flow allowed for the current air flow. The measurement for controller 11 is the setpoint of fuel controller 14. The setpoint of controller 11 is calculated by multiplying the maximum allowed ratio 23 of fuel to air by the current air flow 8. The current air flow is a measured value or optionally the air flow setpoint if the air measurement is a "noisy" signal. Fuel flow increases are thus prevented from increasing beyond the supply of air required for safe combustion. An air flow controller deviation alarm interlock is provided, when air flow target is used as the controller 11 measurement, to prevent increasing fuel flow when the air flow controller 8 is not controlling.

The setpoint of controller 12 is a maximum boiler tube temperature. The measurement is a measured boiler tube temperature 20 or the maximum of a series of boiler metal temperatures. Controller 12 prevents firing over loads.

The setpoint of controller 13 is the maximum position of fuel valve 15 with the measurement being the actual position of valve 15.

The foregoing description is of the preferred embodiment of the invention and is presented for information and illustration and is not intended to limit the scope of the invention. The invention can also be applied in petroleum refining and chemical processes or any process that has measurements and limiting values for said measurements that when the limiting values are exceeded, require adjustments to the process to return all measurements to within their limiting values.

I claim:

1. A method for controlling a process operating under supervision of a plurality of feedback control loops, said method comprising:
   (a) providing at least one constraint controller including a combination of operatively connected and interrelated override controllers, each of said override controllers including at least one individual controller, said override controllers combined in a preemptive constraint control system which system provides responsive regulation of interrelated process conditions attendant to said process being controlled;
   (b) selecting a group of variables to be monitored;
   (c) establishing operating parameters for said process being controlled based upon said group of variables, including
     (1) establishing a setpoint for each variable within said group of variables, said setpoint and its corresponding variable being controlled by a selected one of said individual controllers,
     (2) establishing a limit value for each of said variables within said group of variables,
     (3) establishing limit violation direction for each operating parameter, and
     (4) choosing a common process parameter to receive output from said individual controllers;
   (d) providing a plurality of monitoring means, said monitoring means being selectively connected with said override controllers and positioned to monitor said group of variables;
   (e) monitoring by selected ones of said monitoring means, each of said variables within said group of variables, and measuring at an instant in time each of said variables within said group, thus establishing a measured value for each of said variables;
   (f) storing each of said measured values;
   (g) then computing a pseudo-value of each of said variables within said group of variables, each of said pseudo-values corresponding to a respective one of said measured values which said pseudo-value and said measured value form a corresponding pair of values;
   (h) storing each of said pseudo-values;
   (i) then selecting one of said measured values and comparing said selected measured value with its corresponding pseudo-value, and repeating such comparison for each of said corresponding pairs of values;
   (j) establishing an array of adjustment values by utilizing sets of control values, each set consisting of one of said setpoints and said corresponding pair of values and computing for each of said control value sets a corresponding adjustment value, said adjustment value being used to bring said measured value of said control value set to a corresponding one of said setpoints;
   (k) selecting one of a plurality of said individual controllers by choosing a final adjustment value for said plurality of feedback control loops by selecting a maximum value from said adjustment values computed in step (j) if a positive adjustment value moves said process away from one of said limit values, otherwise, by selecting a minimum value from said adjustment values computed in step (j) if a negative adjustment value moves said process away from a selected one of said limit values, thereby leaving a number of non-selected individual controllers;
   (l) changing said common process parameter by said final adjustment value; and
   (m) repeating steps (e) through (l) in a continuous manner.

2. The method of claim 1 wherein said individual controllers provide integral control action, and wherein said individual controllers have a reset windup inhibiting feature, said method further comprising the steps of:
   computing a deviation for each of said variables from said setpoints for each of said non-selected individual controllers;
   computing an integral sum for said deviation in said limit violation direction from setpoint for each individual controller;
   modifying said adjustment values for said common process parameter, based on integration of said deviation, and utilizing said modified adjustments when choosing said final adjustment value for said plurality of said feedback control loops;
   then continuing said integration of deviations of said variables that cross said setpoint opposite to said limit violation direction, until said integral sum reaches zero; and
   discontinuing integration subsequent to said integral sum reaching zero until said variable recrosses said setpoint in said limit violation direction.

3. The method of claim 2 further comprising:
   providing said constraint controllers in a cascade control structure; and
   providing in said cascade control structure at least one constraint controller functioning within said cascade control structure in a position otherwise occupied by one of said individual controllers.

4. The method of claim 2 further comprising establishing rules in a rule based "fuzzy logic" control utilizing the logic of this invention.

5. The method of claim 1 further comprising the steps of:

computing for each of said individual controllers a deviation of said variable from said setpoint;

establishing an array of most recent implemented adjustment values to said common process parameter;

establishing an array of sets of factors, each of said factors in each of said sets corresponding to one of said recently implemented adjustment values and representing an unrealized expected change in its corresponding said variable, at current time, resulting from said implemented adjustment, and each of said sets of factors corresponding to one of said individual controllers;

utilizing each of said sets of factors for each of said individual controllers to compute an eventual resting value of said variable and computing a deviation of eventual resting value from setpoint utilizing a control algorithm and said deviation, to develop an adjustment modification reducing said deviation to compute an adjustment modification representing total adjustment required to produce said unrealized expected change, and computing said adjustment modification for each of said controllers; and modifying each of said adjustment values by a corresponding one of said adjustment modifications.

6. The method of claim 1 further comprising the steps of:

selecting a hard limit that said measured value must not exceed; and establishing soft limits, to be used as said setpoints, with said soft limits positioned a distance from said hard limits, in direction opposite to said limit violation direction, said distance determined so that it is statistically improbable that said measured value will exceed said hard limit in said limit violation direction, with said statistically determined distance based on recent past said measured value variation.

7. The method of claim 1 as applied to optimize excess air addition in a combustion process, wherein in step (e) the variables include carbon monoxide concentration of a stream of combustion products and oxygen concentration of said stream of combustion products, the method further comprising the steps of:

computing the natural logarithm of said carbon monoxide concentration;

utilizing said natural logarithm of said carbon monoxide concentration as said variable for a selected one of said individual controllers in a said constraint controller;

utilizing said oxygen concentration as said variable for a maximum oxygen limit controller and a minimum oxygen limit controller, said maximum and said minimum oxygen limit controllers being a part of said constraint controller system;

adjusting setpoints of said oxygen limit controllers based upon preprogrammed acceptable values correlated to furnace combustion load as indicated by a measurement inferring amount of combustion such as steam flow from a steam boiler;

controlling the ratio of air flow to total firing load;

limiting the air flow control through said constraint controllers utilizing said individual controllers for (1) minimum air flow as determined by minimum air to fuel flow ratio, (2) minimum fire box pressure, and (3) minimum air flow valve position; and limiting fuel flow control through said constraint controllers utilizing said individual controllers for (1) maximum fuel flow as determined by maximum fuel to air flow ratio, (2) maximum tube temperature, and (3) maximum fuel flow valve position.

8. The method of claim 1 as applied to the distillation process so as to affect separation of components in a distillation column by adjusting energy flow through said column by applying said constraint controllers wherein the measurements of step (e) reflect the capability of passing energy through said column, further comprising the steps of:

computing constraint variables, that reflect the capability of passing energy through said column, from said measured variables;

establishing hard limit values of said constraint variables that reflect maximum capability of passing energy through said column;

establishing a limit violation direction for each of said hard limit values, said distillation column being incapable of acceptable operation with constraint variable values beyond corresponding said hard limits in corresponding said limit violation direction;

establishing said individual controllers setpoints at a distance from corresponding said hard limit values in a direction opposite to said limit violation direction, said distance being a minimum distance to provide an acceptable probability of said constraint variable reaching said hard limit value; and applying said adjustment values to a said distillation column parameter that affects energy flow through said distillation column.

9. A method for controlling a process by interconnecting a plurality of constraint controllers in a cascade control structure, each constraint controller including a plurality of individual controllers, each individual controller controlling a selected variable chosen from the group consisting of a monitored process variable and a variable computed from a set including monitored process variables and constants, such that one constraint controller selects a maximum positive adjustment to a common process parameter of said process, while a different constraint controller selects a minimum negative adjustment to said common process parameter of said process, said method comprising the steps of:

passing said adjustments developed by a first constraint controller of said constraint controllers to a second constraint controller of said constraint controllers with said adjustment from said first constraint controller treated as an adjustment developed by one of said individual controllers in said second constraint controller;

communication between said constraint controllers so that no one of said adjustments is made to said common process parameter whenever opposing adjustments, excluding signals cascaded from other controllers, are selected in two different constraint controllers adjusting said common process parameter; and producing an alarm when no adjustment is made due to said opposing adjustments.

10. A method of modifying constraint control adjustments to a common process parameter of a multiplicity of individual controllers, which individual controllers constitute a constraint controller, to compensate for an expected effect on measured variables controlled by said individual controllers, of recently implemented adjustments to said common process parameter, said method comprising the steps of:
(a) establishing an array of said recently implemented adjustments to said common process parameters;
(b) establishing an array of sets of factors, each of said factors in each of said sets corresponding to one of said recently implemented adjustments and representing an unrealized expected change in one of said measured variables controlled by said individual controller, at current time, resulting from said implemented adjustment, and each of said sets of factors corresponding to one of said individual controllers;
(c) utilizing each of said sets of factors to compute an adjustment modification representing a total adjustment required to product said unrealized expected change, and computing said adjustment modification for each of said individual controllers;
(d) modifying each of said constraint control adjustments by a corresponding one of said adjustment modifications; and
(e) selecting a final adjustment value for said common process parameter from said modified constraint control adjustments.

11. The method of claim 10 further comprising:
establishing a limit violation direction from a setpoint for each of said individual controllers;
integrating a deviation of an eventual resting value in said limit violation direction from said setpoint for each of said individual controllers;
computing a common process parameter adjustment value based upon said deviation;
adding said deviation based adjustment values to said selected adjustment value;
adjusting said sets of factors to achieve a desired dynamic control response;
establishing a measurement standard variation range by adding to the mean of said measured variable for a recent past period, a positive factor multiplied by the standard deviation of said measured variable and a negative factor multiplied by said standard deviation, said standard deviation computed for said recent past period, said measurement standard variation range being established for each of said individual controllers;
adjusting said sets of factors based upon computations utilizing said array of recently implemented adjustments and the resulting significant changes to said measured variables which resulting significant changes correspond to said implemented adjustments, with significants determined by changes causing measurements to extend beyond said standard variation range; and
computing a common process parameter adjustment value based upon said deviation and upon control algorithms other than proportional, integral, derivative (PID) control algorithms.

12. The method of claim 11 wherein the step of computing a common process parameter adjustment value is based upon a deviation integral.

13. A method of controlling a process by computing adjustments to a common process parameter of a multiplicity of individual controllers, which individual controllers constitute a constraint controller, each of said individual controllers responding to a rate of approach of a measured variable to setpoint for each of said individual controllers, said method comprising the steps of:

(a) establishing an array of adjustment values for said constraint controller, each value in said array resulting from a control response from one of said individual controllers constituting said constraint controller;
(b) establishing a limit violation direction for said measured variable deviations for each of said individual controllers;
(c) establishing a measurement standard variation range by adding to the mean of said measured variable measured during a recent past period, a positive factor multiplied by the standard deviation of said measured variable and a negative factor multiplied by said standard deviation, said standard deviation having been computed for said recent past period, said measurement standard variation range being established for each of said multiplicity of individual controllers;
(d) determining a selected portion of each one of said array of said adjustment values, said selected portion resulting from said rate of approach of said measured variables;
(e) selecting from said array of adjustment values a maximum value when a positive adjustment value moves the process in a direction opposite to said limit violation direction and a minimum value from said array when a negative adjustment moves said process opposite to said limit violation direction;
(f) adding to said selected adjustment value, each of said rate selected portions corresponding to each of said individual controllers constituting said constraint controller, when said measured variable corresponding to said individual controller is beyond said measurement standard variation range in said limit violation direction;
(g) summing for each individual controller said rate selected portions for each respective one of said individual controllers;
(h) subtracting from said selected adjustment value said sum of said rate selected portions when said rate of approach corresponding to said sum of said rate selected portions changes sign when said measured value is within said measurement standard variation range; and
(i) zeroing said sum of said selected portions.

14. A method of arranging and interconnecting constraint controllers to optimize excess air addition to a combustion process, said constraint controllers consisting of a multiplicity of individual controllers, each of said individual controllers controlling a measured variable of said combustion process which reflects the condition of said combustion process, said method comprising the steps of:
(a) measuring selected combustion process conditions;
(b) establishing a setpoint for each of said controlled measured variables;
(c) measuring the carbon monoxide concentration of a stream of combustion products
(d) measuring oxygen concentration of said stream of combustion products;
(e) computing the natural logarithm of said carbon monoxide concentration;
(f) utilizing said natural logarithm of said carbon monoxide concentration as said measured variable signal for a selected one of a said individual controllers in a said constraint controller;

(g) utilizing said oxygen concentration as said measured variable for a maximum oxygen limit controller and a minimum oxygen limit controller, said maximum and said minimum oxygen limit controllers being a part of said constraint controller system;

(h) adjusting setpoints of said oxygen limit controllers based upon preprogrammed acceptable values correlated to furnace load as indicated by a measurement inferring amount of combustion such as steam flow from a steam boiler;

(i) controlling the ratio of air flow to total firing load;

(j) limiting air flow control through said constraint controllers utilizing said individual controllers for (1) minimum air flow as determined by minimum air to fuel flow ratio, (2) minimum fire box pressure, and (3) minimum air flow valve position; and (k) limiting fuel flow control through said constraint controller utilizing said individual controllers for (1) maximum fuel flow as determined by maximum fuel to air flow ratio, (2) maximum tube temperature, (3) maximum fuel flow valve position.

15. A method for eliminating unnecessary individual controller manipulation of process parameters, said unnecessary manipulation being caused by control response to small amplitude variation of a controlled measured variable wherein said unnecessary manipulation prevents the process from reaching a quiescent steady state, said method comprising the steps of:

(a) inhibiting said unnecessary manipulation when said measured variable is within a factor of a statistical standard deviation of the mean of a first-in/first-out set of recent measured variables;

(b) inhibiting particular control responses; and (c) developing derivative control response based upon change in said measured variable.

16. The method of claim 15 wherein the step of inhibiting particular control responses is directed to selectively inhibiting derivative control responses of a proportional integral derivative (PID) controller.

17. A method of controlling a calculated process variable, said method comprising the steps of:

(a) monitoring a process to establish process variables;

(b) performing calculations by utilizing constants, said process variables and setpoints of said process variables;

(c) establishing an integral only controller through a digital control algorithm with an adjustable integral time and scaling gain;

(d) using the result of said calculations as the variable controlled by said integral only controller;

(e) using a setpoint adjusted by said integral only controller as said setpoint used in said calculations;

(f) setting said scaling gain equal to the inverse of said calculations; and (g) setting said adjustable integral time equal to the duration between executions of the digital control algorithm of said integral only controller.

18. A method for controlling a process utilizing a plurality of individual controllers and a plurality of feedback control loops to provide an output to manipulate a common process parameter and to regulate a plurality of variables, comprising the steps of:

(a) providing an output and an output adjustment to said common process parameter;

(b) for each individual controller, (1) measuring the value of one variable of said plurality of variables, and determining a measured value characteristic, (2) determining a setpoint and a setpoint characteristic for said variable, (3) determining a limit violation direction for said variable, (4) deriving a deviation characteristic by determining the difference between said setpoint characteristic and said measured value characteristic, (5) developing a control characteristic utilizing said deviation characteristic, (6) modifying said control characteristic, and (7) determining an individual adjustment utilizing said modified control characteristic, said individual adjustment being that adjustment to said common process parameter tending to reduce the deviation of a corresponding one of said plurality of variables from said corresponding setpoint;

(c) selecting an individual adjustment having the maximum value if an increased adjustment to said common process parameter would change a corresponding one of said variables in the opposite direction of said limit violation direction of said variable, otherwise, selecting an individual adjustment having the minimum value if a decreased adjustment to said common process parameter would change said corresponding variable in the opposite direction of said limit violation direction of said variable; and (d) selecting the individual controller corresponding to said selected individual adjustment, the remaining individual controllers being non-selected, the individual adjustment of said common process parameter.

19. The method of claim 18, further comprising the steps of repeating the steps (b) through (d) in a continuous manner.

20. The method of claim 18 wherein the control characteristic of steps b(5) through b(7) is modified by the difference between said deviation characteristic and a pseudo-value characteristic.

21. The method of claim 18 wherein the common process parameter manipulates energy flow through a distillation column.

22. The method of claim 18 wherein the process is a combustion process and the common process parameter is the air to fuel ratio and one of the variables is carbon monoxide concentration.

23. The method of claim 18 wherein one of the variables of step (b) is the logarithm of carbon monoxide concentration.

24. The method of claim 18 wherein the individual controllers provide control action of the type selected from the group consisting of proportional, integral, and derivative and combinations thereof.

25. The method of claim 18 wherein said individual controllers provide at least integral control action, further comprising the steps after step (b) and before step (c) of:

for each of said non-selected individual controllers (1) integrating said deviation characteristic in said corresponding limit violation direction, forming an integral sum, (2) determining an integration adjustment from said integral sum, and (3) modifying said individual adjustment by said integration adjustment.

26. The method of claim 18 wherein said individual controllers provide at least integral control action, further comprising the steps after step (b) and before step (c) of:

for each of said non-selected individual controllers
(1) integrating said deviation characteristic in said corresponding limit violation direction, forming an integral sum,
(2) determining an integration adjustment from said integral sum, and
(3) modifying said adjustment of said common process parameter by said integration adjustment.

27. The method of claim 18, wherein said individual controllers provide at least integral control action, further comprising the steps after step (b) and before (c) of:

for each one of said non-selected individual controllers
(1) integrating said deviation characteristic forming an integral sum,
(2) determining an integration adjustment from said integral sum,
(3) modifying said adjustment of said common process parameter by said integration adjustment,
(4) continuing integration of said deviation characteristic of said corresponding variable that crosses said corresponding setpoint in a direction opposite to said corresponding limit violation direction and computing said integral sum until said integral sum reaches zero, and
(5) discontinuing integration of said deviation characteristic subsequent to said integral sum reaching zero until said variable recrosses said setpoint in the same direction as said limit violation direction.

28. The method of claim 18, wherein said individual controllers provide at least integral control action, further comprising the steps after step (b) and before step (c) of:

for each one of said non-selected individual controllers
(1) integrating said deviation characteristic forming an integral sum,
(2) determining an integration adjustment from said integral sum,
(3) modifying said individual adjustment by said integration adjustment,
(4) continuing integration of said deviation characteristic of said corresponding variable that crosses said corresponding setpoint in a direction opposite to said corresponding limit violation direction and computing said integral sum until said integral sum reaches zero, and
(5) discontinuing integration of said deviation characteristic subsequent to said integral sum reaching zero until said variable recrosses said setpoint in the same direction as said limit violation direction.

29. The method of claim 18, further comprising the steps of:

establishing an array of the most recent said output adjustments to said common process parameter;
for each one of said individual controllers, establishing a set of factors, each factor in said set of factors corresponding to one said output adjustment of said array of adjustments, and representing an unrealized expected change of a corresponding one of said plurality of variables at current time resulting from said corresponding output adjustment of said array of adjustments;
for each said individual controller, computing an eventual resting value characteristic of said corresponding one of said plurality of variables utilizing said set of factors and said array of output adjustments and using said eventual resting value characteristic to determine an individual adjustment modification to reduce said deviation characteristic; and
modifying each of said individual adjustments by a corresponding one of said individual adjustment modifications.

30. The method of claim 18, further comprising the steps of:

establishing an array of the most recent said output adjustments to said common process parameter;
for each one of said individual controllers, establishing a set of factors, each factor in said set of factors corresponding to one said output adjustment of said array of adjustments, and representing an unrealized expected change of a corresponding one of said plurality of variables at current time resulting from said corresponding output adjustment of said array of adjustments;
for each said individual controller, computing an eventual resting value characteristic of said corresponding one of said plurality of variables utilizing said set of factors and said array of output adjustments and using said eventual resting value characteristic to determine an individual adjustment modification to reduce said deviation characteristic; and
modifying said common process parameter by said individual adjustment modification.

31. A method for controlling a combustion process utilizing a plurality of individual controllers and a plurality of feedback control loops to provide an output to manipulate a combustion process parameter affecting the air to fuel ratio and to regulate a plurality of variables, comprising the steps of:

(a) providing an output and an output adjustment to said combustion process parameter;
(b) developing measurement characteristics for said plurality of variables;
(c) measuring the oxygen concentration of the combustion gas products to develop a said measurement characteristic,
(d) measuring the carbon monoxide concentration of said combustion gas products to develop a said measurement characteristic,
(e) computing the logarithm of said carbon monoxide concentration,
(f) for each individual controller,
(1) establishing one of said measurement characteristics as an individual measurement characteristic,
(2) determining a setpoint and a setpoint characteristic for said individual measurement characteristic,
(3) determining a limit violation direction for said individual measurement characteristic,
(4) deriving a deviation characteristic by determining the difference between said setpoint characteristic and said individual measurement characteristic, (5) developing a control characteristic utilizing said deviation characteristic;

(6) modifying said control characteristic;

(7) determining an individual adjustment utilizing said modified control characteristic, said individual adjustment being that adjustment to said combustion process parameter tending to reduce the deviation of a corresponding one of said individual measurement characteristics from said corresponding setpoint;

(g) establishing said logarithm as said individual measurement characteristic and establishing increasing carbon monoxide concentration as said limit violation direction for a said individual controller forming a carbon monoxide controller;

(h) establishing said measurement characteristic developed from oxygen concentration as said individual measurement characteristic and establishing decreasing oxygen concentration as said limit violation direction for a said individual controller forming a minimum oxygen controller;

(i) establishing said measurement characteristic developed from oxygen concentration as said individual measurement characteristic and establishing increasing oxygen concentration as said limit violation direction for a said individual controller forming a maximum oxygen controller;

(j) selecting a maximum of said individual adjustments developed by said carbon monoxide controller and said minimum oxygen controller as a maximum select adjustment;

(k) selecting a minimum of said maximum oxygen controller and said maximum select adjustment as said adjustment to said combustion process parameter, the remaining individual controllers being non-selected.

32. The method of claim 31, further comprising the step of repeating the steps (b) through (k) in a continuous manner.

33. A method for controlling a process utilizing a feedback controller to provide an output to manipulate a process parameter to regulate a variable, comprising the steps of:

(a) measuring the value of said variable, and determining a measured value characteristic;

(b) determining a setpoint and a setpoint characteristic for said variable;

(c) deriving a deviation characteristic by determining the difference between said setpoint characteristic and said measured value characteristic;

(d) developing a control characteristic utilizing said deviation characteristic;

(e) establishing an array of most recent said deviation characteristics;

(f) computing the standard deviation of said array;

(g) calculating a standard variation range by multiplying said standard deviation by a factor reflecting the range of said measurement characteristic variation during steady process operation;

(h) modifying said control characteristic based on comparison of said measured value characteristic relative to said standard variation range;

(i) utilizing said modified control characteristic to develop an adjustment to said process parameter, reducing said adjustment when said measured value characteristic is within said standard variation range;

(j) manipulating said process parameter by said reduced adjustment.

34. The method of claim 33, further comprising the step of repeating the steps (a) through (j) in a continuous manner.

35. Apparatus for controlling a process by controlling a common process parameter, comprising:

(a) a plurality of individual controllers for providing an output to manipulate a common process parameter and to regulate a plurality of variables and an output adjustment for controlling the common process parameter;

(b) means for measuring the value of one variable of said plurality of variables and determining a measured value characteristic;

(c) means for determining a setpoint and a setpoint characteristic for said variable;

(d) means for determining a limit violation direction for said variable;

(e) means for deriving a deviation characteristic by subtracting said setpoint characteristic from said measured value characteristic;

(f) means for developing a pseudo-value characteristic;

(g) means for modifying said deviation characteristic by subtracting said pseudo-value characteristic from said deviation characteristic;

(h) means for determining an individual adjustment utilizing said modified deviation characteristic, said individual adjustment being that adjustment to said common process parameter tending to reduce the deviation of a corresponding one of said plurality of variables from said corresponding setpoint;

(i) means for selecting an individual adjustment having the maximum value if an increased adjustment to said common process parameter would change a corresponding one of said variables in the opposite direction of said limit violation direction of said variable, otherwise, selecting an individual adjustment having the minimum value if a decreased adjustment to said common process parameter would change said corresponding variable in the opposite direction of said limit violation direction of said variable; and (j) means for selecting the individual controller corresponding to said selected individual adjustment, the remaining individual controllers being non-selected, the individual adjustment of said selected individual controller becoming the adjustment to said common process parameter.

36. An apparatus for controlling a combustion process by manipulating a combustion process parameter, comprising:

(a) a plurality of individual controllers for providing an output to manipulate a combustion process parameter affecting the air to fuel ratio and to regulate a plurality of variables and an output adjustment for manipulating the combustion process parameter;

(b) means for measuring the values of said plurality of variables, the variables including oxygen and carbon monoxide concentration, and determining measured value characteristics;

(c) means for computing the logarithm of said carbon monoxide concentration to develop a said measurement characteristic;

(d) means for individual controller for establishing one of said measurement characteristic as an individual measurement characteristic;

(e) means for individual controller for determining a setpoint and a setpoint characteristic for said individual measurement characteristic;

(f) means for each individual controller for determining a limit violation direction for said individual measurement characteristic;

(g) means for each individual controller for deriving a deviation characteristic by determining the difference between said setpoint characteristic and said individual measurement characteristic;

(h) means for each individual controller for developing a control characteristic utilizing said deviation characteristic;

(i) means for each individual controller for modifying said control characteristic;

(j) means for each individual controller for determining an individual adjustment utilizing said modified control characteristic, said individual adjustment being that adjustment to said combustion process parameter tending to reduce the deviation of a corresponding one of said individual measurement characteristics from said corresponding setpoint;

(k) means for establishing said measurement characteristic developed from said logarithm as said individual measurement characteristic and establishing increasing said carbon monoxide concentration as said limit violation direction for a said individual controller forming a carbon monoxide controller;

(l) means for establishing said measurement characteristic developed from said oxygen concentration as said individual measurement characteristic and establishing decreasing said oxygen concentration as said limit violation direction for a said individual controller forming a minimum oxygen controller;

(m) means for establishing said measurement characteristic developed from said oxygen concentration as said individual measurement characteristic and establishing increasing said oxygen concentration as said limit violation direction for a said individual controller forming a maximum oxygen controller;

(n) means for selecting a maximum of said individual adjustments developed by said carbon monoxide controller and said minimum oxygen controller as a maximum select adjustment;

(o) means for selecting a minimum of said individual adjustment developed by said maximum oxygen controller and said maximum select adjustment as said adjustment to said combustion process parameter, said individual controller developing said individual adjustment corresponding to said adjustment to said combustion process parameter is the selected controller, the remaining individual controllers being non-selected;

(p) means for manipulating said combustion process parameter by said selected minimum.

* * * * *

UNITED STATES PATENT AND TRADEMARK OFFICE
CERTIFICATE OF CORRECTION

PATENT NO.  : 5,091,844
DATED       : February 25, 1992
INVENTOR(S) : ALBERT J. WALTZ It is certified that error appears in the above-identified patent and that said Letters Patent is hereby corrected as shown below:

At column 10, line 36, change "Block 28" to --Block 26--.
At column 10, line 43, change "sued" to --used--.
At column 12, line 31, change "(1 n C0)" to --(ln C0)--.
At column 12, lines 34-35, change "1 n C0" to --ln C0--.
At column 12, line 38, change "1 n C0" to --ln C0--.
At column 12, line 40, change "1 n C0" to --ln C0--.

At column 24, line 36, between "said" and "common" insert --selected
    individual controller becoming the adjustment to said--.

Signed and Sealed this

Twenty-fourth Day of August, 1993

Attest:

BRUCE LEHMAN

Attesting Officer

Commissioner of Patents and Trademarks